US012646643B2

(12) United States Patent
Shimizu et al.

(10) Patent No.: US 12,646,643 B2
(45) Date of Patent: Jun. 2, 2026

(54) MAGNETORHEOLOGICAL FLUID

(71) Applicants: YAMASHITA RUBBER CO., LTD., Saitama (JP); HONDA MOTOR CO., LTD., Tokyo (JP)

(72) Inventors: Hideyuki Shimizu, Fujimino-city (JP); Taiki Koseki, Fujimino-city (JP); Toshio Inoue, Tokyo (JP); Yuho Ito, Tokyo (JP)

(73) Assignees: YAMASHITA RUBBER CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 729 days.

(21) Appl. No.: 17/865,404

(22) Filed: Jul. 15, 2022

(65) Prior Publication Data

US 2023/0029434 A1 Jan. 26, 2023

(30) Foreign Application Priority Data

Jul. 26, 2021 (JP) ................................ 2021-121782

(51) Int. Cl.
*H01F 1/44* (2006.01)

(52) U.S. Cl.
CPC .................................... *H01F 1/447* (2013.01)

(58) Field of Classification Search
CPC ....................................................... H01F 1/447
See application file for complete search history.

(56) References Cited

U.S. PATENT DOCUMENTS

| | | | | |
|---|---|---|---|---|
| 5,989,447 A * | 11/1999 | Podszun | H01F 1/447 | 252/62.52 |
| 6,036,765 A * | 3/2000 | Farrow | C09K 8/46 | 501/148 |
| 6,132,633 A * | 10/2000 | Carlson | H01F 1/447 | 252/62.55 |
| 6,395,193 B1 | 5/2002 | Kintz et al. | | |
| 11,879,519 B2 * | 1/2024 | Shimizu | H01F 1/447 | |
| 2003/0071238 A1 | 4/2003 | Kintz et al. | | |
| 2004/0135114 A1 * | 7/2004 | Iyengar | H01F 1/447 | 252/62.52 |
| 2004/0140447 A1 | 7/2004 | Kintz et al. | | |

FOREIGN PATENT DOCUMENTS

| | | | | |
|---|---|---|---|---|
| CN | 210388536 | | 4/2020 | |
| JP | S6375073 | | 4/1988 | |
| JP | 2002-121578 | * | 4/2002 | |
| JP | 2004-0966017 | * | 3/2004 | |
| JP | 2006505937 | | 2/2006 | |
| JP | 2006505957 | | 2/2006 | |
| JP | 2014-033150 | * | 2/2014 | |
| JP | 2017092120 | | 5/2017 | |
| JP | 2019068073 | | 4/2019 | |
| WO | WO-0103150 A1 | * | 1/2001 | H01F 1/447 |

OTHER PUBLICATIONS

Translation for JP 2002-121578, Apr. 26, 2002.*

* cited by examiner

*Primary Examiner* — C Melissa Koslow
(74) *Attorney, Agent, or Firm* — JCIPRNET

(57) ABSTRACT

A magnetorheological fluid utilizing properties of thixotropic agents and having well-balanced sedimentation properties includes: a magnetic material; a medium to allow the magnetic material to be dispersed therein; and at least one dispersant selected from sepiolite and smectite or a dispersant including sepiolite and bentonite.

6 Claims, No Drawings

MAGNETORHEOLOGICAL FLUID

CROSS REFERENCE TO RELATED APPLICATIONS

This application is based on and claims priority under 35 USC § 119 from Japanese Patent Application No. 2021-121782 filed Jul. 26, 2021.

BACKGROUND

Technical Field

The present invention relates to a magnetorheological fluid.

Related Art

A magnetorheological (MR) fluid contains a magnetic material, such as iron or magnetite, dispersed in a certain dispersion medium (e.g., see Patent Document 1).

CITATION LIST

Patent Literature

Patent Document 1: Japanese Unexamined Patent Application Publication (Translation of PCT Application) No. 2006-505937

SUMMARY

The magnetorheological fluid has a drawback in that the magnetic material may settle when left to stand. Thus, in order to reduce or prevent such sedimentation of the magnetic material, a technique of adding a thixotropic agent is employed that utilizes a thickener or a highly viscous medium or reduces a sedimentation rate of the magnetic material.

However, the above technique of adding a thixotropic agent may still give rise to a problem of sedimentation of the magnetic material because the magnetorheological fluid, which is highly viscous in a static state, becomes less viscous in a dynamic state due to breakage of hydrogen bonds between the thixotropic agents.

It is an object of certain embodiments of the present invention to provide a magnetorheological fluid that utilizes properties of thixotropic agents and has well-balanced sedimentation properties.

Certain embodiments of the present invention provide a magnetorheological fluid including: a magnetic material; a medium to allow the magnetic material to be dispersed therein; and at least one dispersant selected from sepiolite and smectite.

Certain embodiments of the present invention provide a magnetorheological fluid including: a magnetic material; a medium to allow the magnetic material to be dispersed therein; and a dispersant including sepiolite and bentonite.

Preferably, in the magnetorheological fluid, a concentration of the magnetic material may be 25 wt % to 75 wt %, a concentration of the medium may be 25 wt % to 75 wt %, and a concentration of the dispersant may be 0.5 wt % to 6 wt %.

Preferably, the magnetorheological fluid may further contain a reinforcing agent.

Preferably, the reinforcing agent may be selected from polyhydroxycarboxylic acid derivatives including polyhydroxycarboxylic acid amides or polyhydroxycarboxylic acid esters.

Preferably, a concentration of the reinforcing agent in the magnetorheological fluid may be 0.025 wt % to 18 wt %.

Certain embodiments of the present invention provide a magnetorheological fluid that utilizes properties of thixotropic agents and has well-balanced sedimentation properties.

DETAILED DESCRIPTION

An exemplary embodiment (hereinafter referred to as a "present embodiment") of the present invention is described below. It should be noted that the present invention is not limited to the present embodiment given below and is susceptible to various modifications within its scope.

(Medium)

In the present embodiment, a medium for the magnetorheological fluid may be mineral oil, vegetable oil, glycol-based liquid, silicone oil, water, etc. Specific examples include poly-α-olefin, rapeseed ester oil, hydrocarbon oil, ethylene glycol, propylene glycol, isoparaffin, alkylnaphthalene, fluorine oil, and perfluoroether. These are used alone or mixed in various combinations.

In the present embodiment, a mixed medium consisting of ethylene glycol, propylene glycol, and water is used as the medium.

In the present embodiment, the concentration of the medium in the magnetorheological fluid is 25 wt % to 75 wt %, preferably 30 wt % to 50 wt %. Too little medium in the magnetorheological fluid will disadvantageously tend to significantly increase the viscosity of the magnetorheological fluid and reduce the fluidity of the magnetorheological fluid itself. Too much medium in the composition will disadvantageously reduce a relative amount of the magnetic material and tend to result in a failure to achieve sufficient viscosity change and shear stress upon application of a magnetic field.

(Magnetic Material)

In the present embodiment, a paramagnetic compound, a superparamagnetic compound, or a ferromagnetic compound is used as the magnetic material. Specific examples include iron, iron alloys, iron oxides, iron nitrides, iron carbides, chromium dioxides, low-carbon steel, silicon steel, nickel, cobalt, and mixtures thereof. Iron oxides include pure iron oxides and oxides containing a small amount of manganese, zinc, barium, etc. Further examples include the magnetic material subjected to a hydrophilic surface treatment, carbonyl iron powder or the like, iron formed with a surface oxide film (hard grade), iron with a surface oxide film removed (soft grade), magnetite, manganese-zinc ferrite, etc. Alloys containing aluminum, silicon, cobalt, nickel, vanadium, molybdenum, chromium, tungsten, manganese, copper, etc. may also be used. Depending on the solvent used, hydrophobic treatment may be applied to surfaces of these materials.

The particle size of the magnetic material is typically 0.5 μm to 50 μm, preferably 1 μm to 20 μm. Too small particle size of the magnetic material will disadvantageously tend to result in a failure to achieve sufficient shear stress upon application of an external magnetic field. Too large particle size of the magnetic material will disadvantageously tend to cause easier sedimentation of the magnetic material and cause increased friction during sliding.

In the present embodiment, the concentration of the magnetic material in the magnetorheological fluid is 25 wt % to 75 wt %, preferably 50 wt % to 70 wt %. Too little magnetic material in the magnetorheological fluid will disadvantageously tend to result in a failure to increase the kinematic viscosity under application of a magnetic field, significantly diminishing the performance as a magnetorheological fluid. Too much magnetic material in the magnetorheological fluid will disadvantageously tend to make the fluid clayish and significantly diminish the characteristic fluidity of the magnetorheological fluid.

(Dispersant)

The dispersant used in the present embodiment is considered to be a substance that disperses the magnetic material into the medium while wrapping around the magnetic material like a net and also forms a network in the medium. Examples of substances that can be used as the dispersant include sepiolite, smectite, and bentonite.

(Sepiolite)

Sepiolite, which is a kind of naturally produced clay minerals, is a hydrous magnesium silicate with a chain structure different from layered clay minerals such as kaolin and talc, which are common clay minerals. A typical chemical structural formula of sepiolite is shown in formula (1) below.

$$Mg_8(OH)_4Si_{12}O_{30}(H2O)_{12} \quad (1)$$

It should be noted that a chemical composition can be obtained by an X-ray fluorescence fundamental parameter method. Also, sepiolite may have different chemical compositions depending on where it is produced or how it is refined, so that a molar ratio between Si and Mg is not limited to that shown in formula (1). Further, sepiolite may contain impurities such as Ca, Al, and Fe. There are two types of sepiolite: a filament-like α-type and a clay-like β-type. Sepiolite produced in China is primarily the α-type sepiolite, and sepiolite produced in Spain, Turkey, and the United States is primarily the β-type sepiolite.

Mixing sepiolite as a dispersant is preferred as it tends to inhibit rusting of the magnetic material. Thus, prevention of wear during operation can be expected when, for example, the magnetorheological fluid is used primarily in direct-acting devices such as mounting devices and shock absorbers for automobiles, seat dampers for construction machines, etc.

(Smectite)

Smectite refers to silicate minerals with a Si—O tetrahedral layered structure, and various natural or synthetic clay minerals can be used. Examples include: dioctahedral smectite such as montmorillonite (e.g., acid clay and bentonite), beidellite, and nontronite; trioctahedral smectite such as saponite, hectorite, sauconite, and fraipontite; and stevensite. Any of these may be used alone, or two or more of these materials may be used in combination. Among these, at least one structure selected from a group consisting of montmorillonite and stevensite is preferred. In these structures, portions of a metal element in octahedral sheets are, for example, isomorphously substituted with a low-valence metal element or include defects.

(Bentonite)

Bentonite refers to montmorillonite-based clays with a structure of several stacked layers each having a three-layer structure composed of a $SiO_4$ tetrahedral layer, a $AlO_6$ octahedral layer, and a $SiO_4$ tetrahedral layer. Between the layers with this three-layer structure, cations of alkali metals (e.g., K and Na) or alkaline earth metals (e.g., Ca), hydrogen ions, and water molecules coordinated at the hydrogen ions are present. Examples of bentonite include natural bentonite, calcium bentonite, and activated bentonite such as natrium bentonite produced by alkali treatment of natural bentonite or acid clay.

In the present embodiment, at least one dispersant selected from sepiolite and smectite is used. In the present embodiment, a dispersant composed of sepiolite and bentonite is also used.

In the present embodiment, the concentration of the dispersant in the magnetorheological fluid is 0.5 wt % to 6 wt %, preferably 2 wt % to 6 wt %. Too little dispersant in the magnetorheological fluid will disadvantageously tend to result in a failure to form a network structure sufficient to hold the magnetic material, diminishing the resistance to sedimentation. Too much dispersant in the magnetorheological fluid will disadvantageously tend to increase the viscosity of the magnetorheological fluid and thus diminish degassing properties for fluids, which may in turn cause cavitation and other problems, and also diminish handling efficiency.

(Reinforcing Agent)

For the purposes of the present disclosure, the term "reinforcing agent" is defined as a material which, when mixed in the magnetorheological fluid, reinforces the network formed by the dispersant, thereby inhibiting agglomeration of the magnetic material and reducing sedimentation of the magnetic material. In the present embodiment, a reinforcing agent is mixed to reinforce the network. This inhibits agglomeration of the magnetic material and reduces sedimentation of the magnetic material. Examples of the reinforcing agent include polyhydroxycarboxylic acid derivatives. Specific example compounds of the polyhydroxycarboxylic acid derivatives include polyhydroxycarboxylic acid amides and polyhydroxycarboxylic acid esters.

In the present embodiment, the concentration of the reinforcing agent in the magnetorheological fluid is 0.025 wt % to 18 wt %, preferably 0.05 wt % to 12 wt %. Too little reinforcing agent in the magnetorheological fluid will disadvantageously tend to result in a failure to provide a satisfactory reinforcing effect for the structure formed by the dispersant, diminishing the sedimentation resistance of the magnetic material. Too much reinforcing agent in the magnetorheological fluid will disadvantageously tend to result in a failure to provide a satisfactory reinforcing effect for the structure formed by the dispersant due to self-association of the reinforcing agent, diminishing the sedimentation resistance of the magnetic material.

In addition to the above components, other additives such as anti-abrasion agents, extreme pressure agents, rust inhibitors, friction modifiers, solid lubricants, antioxidants, defoamers, colorants, and viscosity modifiers may be mixed in the magnetorheological fluid of the present embodiment when necessary. In such cases, any of these additives may be used alone, or two or more of these may be used in combination.

EXAMPLES

The present invention is further discussed below based on Examples. It should be noted that the present invention is not limited to Examples below. Unless specifically indicated otherwise, percentages in Examples and Comparative Examples below are all given by weight.

(1) Preparation of Magnetorheological Fluids

Magnetorheological fluids with compositions shown in Table 1 were prepared.

First, a dispersant and a reinforcing agent are added and stirred into the medium. Then, the magnetic material is added and stirred into the medium. Upon stopping the stirring, binding of the dispersant and the reinforcing agent forms a network structure, increasing the viscosity. As a result, the magnetic material is held in a magnetic material holding structure formed by interstices of the network structure. Then, when a shearing force is applied to the solution again, the network structure collapses, reducing the viscosity.

It should be noted that the method for manufacturing the magnetorheological fluid according to the present embodiment is not particularly limited; the magnetorheological fluid can be prepared by mixing the medium, the magnetic material, the dispersant, the reinforcing agent, and other additives (when necessary) in any order.

(2) Magnetorheological Fluid Testing (a) Sedimentation Test

Each magnetorheological fluid was conditioned in a sample bottle (with a capacity of 24 ml) and left to stand at 23° C. After 240 hours, the height from the fluid surface to the interface where the medium (supernatant) and the magnetic material mixture (sedimentation component) are separated (separation volume [mm]) relative to the total fluid height of the magnetorheological fluid (total fluid volume [mm]) was measured to evaluate the dispersion stability based on the following formula: sedimentation rate [%]=(separation volume [mm]/total fluid volume [mm])×100. A smaller value of the sedimentation rate [%] means better resistance to sedimentation.

(b) Kinematic Viscosity Measurement

Using a Brookfield type viscometer, each magnetorheological fluid in the sample bottle was measured at 25° C. with respect to its kinematic viscosities (cSt) under application of a magnetic field (with magnetic field) using a magnetic base available from KANETEC CO., LTD. (model: MB-T3) and in the absence of application of a magnetic field (without magnetic field). A smaller measured value means a lower viscosity.

(c) Magnetic Field Properties

A ratio (kinematic viscosity ratio: ON/OFF ratio) between the kinematic viscosity under application of a magnetic field (ON) and the kinematic viscosity in the absence of application of a magnetic field (OFF) was obtained as a measure of magnetic field properties as a magnetorheological fluid. Magnetorheological fluids with a larger kinematic viscosity ratio (ON/OFF ratio) can be said to be more useful and have wider applications.

Examples 1-12 and Comparative Example 1

Magnetorheological fluids shown in Tables 1-3 were measured with respect to their sedimentation rates and kinematic viscosities (Examples 1-12). For comparison, a composition shown in Table 1 was prepared and measured with respect to its sedimentation rate and kinematic viscosity under the same conditions as Example 1 (Comparative Example 1). The results are shown in Tables 1-3. The amount of each component in Tables 1-3 is given as concentration (wt %) in the magnetorheological fluid. The magnetorheological fluid components used in these Examples and Comparative Example are described below Table 3.

TABLE 1

| | Examples | | | | Comparative Example |
|---|---|---|---|---|---|
| | 1 | 2 | 3 | 4 | 1 |
| Composition | | | | | |
| Medium (wt %) Ethylene glycol-based solvent 1) | 38.6 | 37.9 | 38.6 | 37.9 | 39.4 |
| Magnetic material (wt %) Carbonyl iron powder 2) | 59.4 | 58.3 | 59.4 | 58.3 | 60.6 |
| Reinforcing agent (wt %) Polyhydroxycarboxylic acid amide derivative 3) | — | 1.9 | — | 1.9 | — |
| Dispersant (wt %) | | | | | |
| Sepiolite 1 4) | 2.0 | 1.9 | — | — | — |
| Sepiolite 2 5) | — | — | 2.0 | 1.9 | — |
| Testing results | | | | | |
| Sedimentation rate (%) (23° C.) | | | | | |
| (0 hours) | 0 | 0 | 0 | 0 | 0 |
| (After 72 hours) | 33 | 7 | 5 | 4 | 65 |
| (After 96 hours) | 37 | 17 | 7 | 9 | 65 |
| (After 200 hours) | 37 | 17 | 7 | 9 | 65 |
| (After 240 hours) | 37 | 17 | 7 | 9 | 65 |
| Kinematic viscosity [cSt] | | | | | |
| Without magnetic field | 1654 | 4694 | 2141 | 5223 | 162 |
| With magnetic field | 26917 | 17456 | 29054 | 16979 | 5915 |
| Kinematic viscosity ratio (ON/OFF) | 16 | 4 | 14 | 3 | 37 |

TABLE 2

| | Examples | | | |
|---|---|---|---|---|
| | 5 | 6 | 7 | 8 |
| Composition | | | | |
| Medium (wt %) Ethylene glycol-based solvent 1) | 38.6 | 37.9 | 38.6 | 37.9 |
| Magnetic material (wt %) Carbonyl iron powder 2) | 59.4 | 58.3 | 59.4 | 58.3 |
| Reinforcing agent (wt %) Polyhydroxycarboxylic acid amide derivative 3) | — | 1.9 | — | 1.9 |
| Dispersant (wt %) | | | | |
| Hectorite 6) | 2.0 | 1.9 | — | — |
| Montmorillonite 7) | — | — | 2.0 | 1.9 |
| Testing results | | | | |
| Sedimentation rate (%) (23° C.) | | | | |
| (0 hours) | 0 | 0 | 0 | 0 |
| (After 72 hours) | 55 | 43 | 61 | 46 |
| (After 96 hours) | 55 | 43 | 61 | 46 |
| (After 200 hours) | 55 | 43 | 61 | 46 |
| (After 240 hours) | 55 | 43 | 61 | 46 |
| Kinematic viscosity [cSt] | | | | |
| Without magnetic field | 324 | 1136 | 584 | 1168 |
| With magnetic field | 14276 | 17530 | 14447 | 18807 |
| Kinematic viscosity ratio (ON/OFF) | 44 | 15 | 25 | 16 |

TABLE 3

| | Examples | | | |
|---|---|---|---|---|
| | 9 | 10 | 11 | 12 |
| Composition | | | | |
| Medium (wt %) Ethylene glycol-based solvent 1) | 38.6 | 37.9 | 38.6 | 37.9 |
| Magnetic material (wt %) Carbonyl iron powder 2) | 59.4 | 58.3 | 59.4 | 58.3 |
| Reinforcing agent (wt %) Polyhydroxycarboxylic acid amide derivative 3) | — | 1.9 | — | 1.9 |
| Dispersant (wt %) | | | | |
| Sepiolite + bentonite + α 8) | 2.0 | 1.9 | — | — |
| Sepiolite + bentonite + α 9) | — | — | 2.0 | 1.9 |
| Testing results | | | | |
| Sedimentation rate (%) (23° C.) | | | | |
| (0 hours) | 0 | 0 | 0 | 0 |
| (After 72 hours) | 9 | 2 | 4 | 4 |
| (After 96 hours) | 9 | 8 | 8 | 7 |
| (After 200 hours) | 9 | 8 | 8 | 7 |
| (After 240 hours) | 9 | 8 | 8 | 7 |
| Kinematic viscosity [cSt] | | | | |
| Without magnetic field | 3082 | 7301 | 2141 | 1720 |
| With magnetic field | 2289 | 2366 | 2512 | 1469 |
| Kinematic viscosity ratio (ON/OFF) | 57 | 13 | 312 | 89 |

(Medium)

1) Ethylene glycol-based solvent: available from CCi Corporation.

(Magnetic Material)

2) Carbonyl iron powder 1: MRF-35 available from Jiangsu Tianyi Ultra-Fine Metal Powder Co., Ltd (particle size: 2.5 microns)

(Reinforcing Agent)

3) Polyhydroxycarboxylic acid amide derivative: RHEOBKY-7405 available from BYK-Chemie GmbH (solution of polypropylene glycol 600 of polyhydroxycarboxylic acid amides; 52% concentration) (Dispersant)

4) Sepiolite 1: Pangel B20 available from Tolsa, S.A.

5) Sepiolite 2: Pangel B42 available from Tolsa, S.A.

6) Hectorite: Sumecton-SEN available from Kunimine Industries Co., Ltd.

7) Montmorillonite: Kunipia-RC-G available from Kunimine Industries Co., Ltd.

8) Garamite-7305 available from BYK-Chemie GmbH

9) Garamite-1958 available from BYK-Chemie GmbH

The results shown in Tables 1-3 show that mixing sepiolite as a dispersant (Examples 1-4) or mixing smectite as a dispersant (Examples 5-8) improves the sedimentation rate (%) of the magnetic material contained in the magnetorheological fluid.

From Examples 1-8, it can be seen that mixing a reinforcing agent (polyhydroxycarboxylic acid amide derivative) (Examples 2, 4, 6, 8) tends to improve the sedimentation rate (%) of the magnetic material.

Further, it can be seen that mixing sepiolite and bentonite as a dispersant (Examples 9-12) significantly improves the sedimentation rate (%) of the magnetic material contained in the magnetorheological fluid.

In these cases too, mixing a reinforcing agent (polyhydroxycarboxylic acid amide derivative) (Examples 10 and 12) tends to improve the sedimentation rate (%) of the magnetic material.

Thus, the results of Examples 1-12 show that the magnetorheological fluid according to the present embodiment possesses a good balance between viscosity and sedimentation properties, with reduced sedimentation and agglomeration of the magnetic material.

In contrast, it can be seen that when none of sepiolite, smectite, and bentonite is mixed as a dispersant (Comparative Example 1), there are no improvements in the sedimentation rate (%) of the magnetic material, failing to achieve a magnetorheological fluid with a good balance between the viscosity as required for a magnetorheological fluid and the sedimentation properties of the magnetic material.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art without departing from the scope and sprit of the present invention. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A magnetorheological fluid comprising:

a magnetic material;

a medium to allow the magnetic material to be dispersed therein;

a dispersant of sepiolite; and a reinforcing agent, wherein the reinforcing agent is polyhydroxycarboxylic acid derivatives, and the polyhydroxycarboxylic acid derivatives is selected from the group consisting of polyhydroxycarboxylic acid amides and polyhydroxycarboxylic acid esters.

2. The magnetorheological fluid according to claim 1, wherein, in the magnetorheological fluid, a concentration of the magnetic material is 25 wt % to 75 wt %, a concentration of the medium is 25 wt % to 75 wt %, and a concentration of the dispersant is 0.5 wt % to 6 wt %.

3. The magnetorheological fluid according to claim 1, wherein a concentration of the reinforcing agent in the magnetorheological fluid is 0.025 wt % to 18 wt %.

4. A magnetorheological fluid comprising:

a magnetic material;

a medium to allow the magnetic material to be dispersed therein;

a dispersant comprising sepiolite and bentonite; and a reinforcing agent, wherein the reinforcing agent is polyhydroxycarboxylic acid derivatives, and the polyhydroxycarboxylic acid derivatives is selected from the group consisting of polyhydroxycarboxylic acid amides and polyhydroxycarboxylic acid esters.

5. The magnetorheological fluid according to claim 4, wherein, in the magnetorheological fluid, a concentration of the magnetic material is 25 wt % to 75 wt %, a concentration of the medium is 25 wt % to 75 wt %, and a concentration of the dispersant is 0.5 wt % to 6 wt %.

6. The magnetorheological fluid according to claim 4, wherein a concentration of the reinforcing agent in the magnetorheological fluid is 0.025 wt % to 18 wt %.

* * * * *